Figure 1:
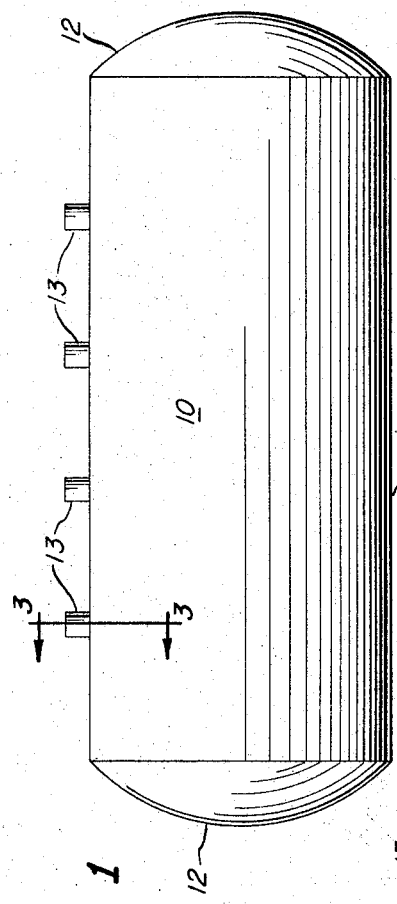

Jan. 17, 1967   R. H. ANDERSON   3,298,560
PIPING ATTACHMENT MEANS FOR PLASTIC VESSELS
Filed July 31, 1963   2 Sheets-Sheet 1

INVENTOR.
Robert H. Anderson
BY Edwin C. Lehner
ATTORNEY

INVENTOR.
Robert H. Anderson
BY Edwin C. Lehner
ATTORNEY

United States Patent Office 3,298,560
Patented Jan. 17, 1967

3,298,560
PIPING ATTACHMENT MEANS FOR PLASTIC VESSELS
Robert H. Anderson, Elmhurst, Ill., assignor to Standard Oil Company, Chicago, Ill., a corporation of Indiana
Filed July 31, 1963, Ser. No. 298,998
5 Claims. (Cl. 220—83)

This invention relates to plastic vessels and particularly to thin-wall plastic vessels provided with metallic connecting means.

Thin-wall plastic vessels, open or closed, depending upon the type of service, frequently require means for connecting metallic conduits, piping, or other hardware to the vessel. Thin-wall plastic tanks having capacities ranging from about 100 to 10,000 gallons or more have been recently developed. Such tanks require means for attaching metallic fittings to the tank to introduce or remove liquid products stored therein and/or provide manways to the interior of the tank.

Such tanks have been developed as replacements for the conventional metal tanks used for the underground storage of liquid hydrocarbons such as gasoline at service stations and for fuel oil for residential heating purposes. As is well known, the service life of such metal tanks is extremely variable due to corrosive environment in soils in which the tanks are buried. The plastic tank development provides tanks that are chemically resistant to corrosive agents and therefore require simple and economical connection means that are also protected against corrosion at the locus of attachment to the tank. Also the connecting means must provide against both axial and rotational movement in the tank wall as well as reinforcement to the tank wall surrounding openings therein. The usual means comprising gasketed fittings provided with collars that are secured to the external surface of the vessels with internal reinforcing backing rings have proven too expensive due to the complexity of parts as well as the cost of and possible damage during installation. Further, such means are not protected against corrosion because the metal parts are exposed to internal and external environments. Inasmuch as the tank walls must be pierced to provide access for means to hold the parts together, there is an extreme loss in wall strength at the point of attachment. Consequently, there is a serious need for simple, economical and easily attached connection means for thin-wall plastic vessels that are an integral part of the tank wall.

The plastic vessels hereinbefore referred to are vessels that are formed from thermosetting resinous materials. Such vessels may be formed solely from the resinous material or be reinforced with glass fibers.

The thin-wall underground plastic storage tanks hereinbefore referred to comprise a shell of glass fiber reinforced plastic laminate having an elongated tubular center portion and curved ends defining a substantially closed hollow structure. The shell of such tanks may range in thickness from about one-eighth to about one-half inch, depending upon the capacity of the tank and the service to which it is put. The smaller the capacity, the thinner the wall, and conversely, the larger the capacity the thicker the wall. The small capacity tanks may be of tubular configuration of varying diameter of, for example, from 2 to 4 feet, and having a length of about 6 feet. A tank having a capacity of about 4000 gallons will have a diameter of about 6 feet and be approximately 20 feet in length. Such tanks must be provided with means for connecting piping thereto to introduce and remove liquid products. In addition, such tanks must be provided with gauging and vent openings. Such openings may range from about one-half inch to as much as 6 inches, depending upon the capacity of the tank. Inasmuch as these tanks are fabricated to form a substantially closed hollow structure, it is desired that the connecting or coupling means be extremely simple and yet produce the physical strength requirements that will permit installation of conduits or piping to the tank under field installation conditions. Such underground tanks are frequently located under residential or service station driveways. Consequently, momentary loads tend to deflect the tanks with concomitant movement of a piping attached thereto. Therefore, the connection means must provide adequate structural strength at the point of attachment to give protection against damage from compressive deflection of the tank that may occur during use. In connection with the small capacity tanks, there is a need for additional reinforcement of the elongated tubular portion against deflection by the weight of the covering soil and possible momentary heavy loading of a vehicle passing thereover in a driveway. For such tanks, it is desirable to have the connection means also function as a reinforcing member for the tank wall.

Therefore, it is an object of the invention to provide a simple and inexpensive connection means for thin-wall plastic vessels suitable for storage of liquids at atmospheric pressure. A further object of the invention is to provide glass fiber-reinforced thin-wall plastic tanks suitable for the underground storage of liquid hydrocarbons with a connection means for openings in said tanks, which means is fluid-tight and not subject to corrosion. These and additional objects will be apparent from the following detailed description.

In accordance with the present invention, a thin-wall plastic vessel is provided with a connection means comprising a metallic flanged tubular body providing an opening in said vessel communicating with the interior thereof. The flange portion of said flanged tubular body is embedded in a wall of said vessel, thereby securing said body in said wall against both axial and rotational movement thereof in said wall.

Figure 2:
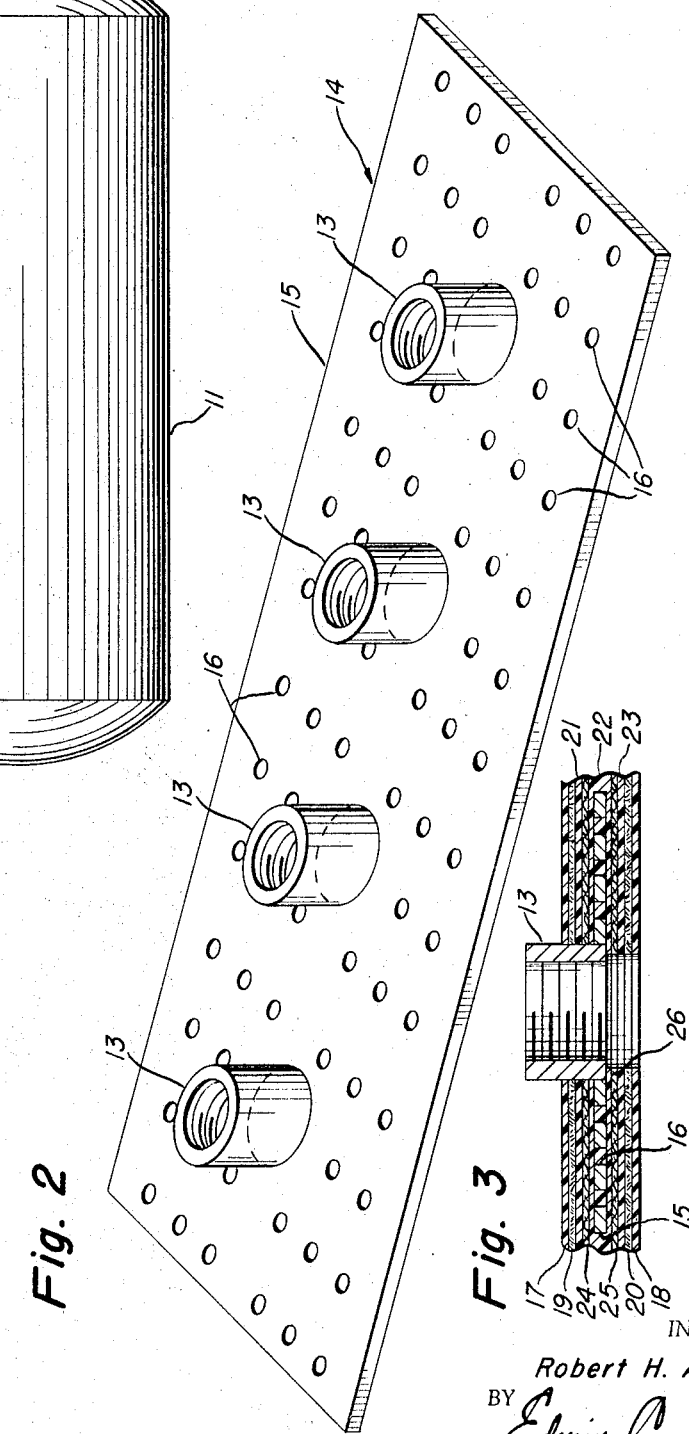
Figure 3:
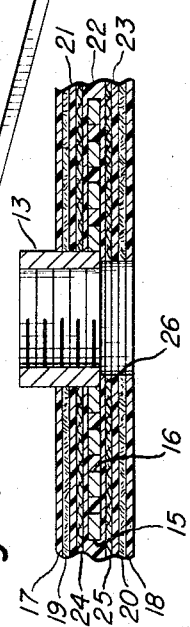
Figure 4:
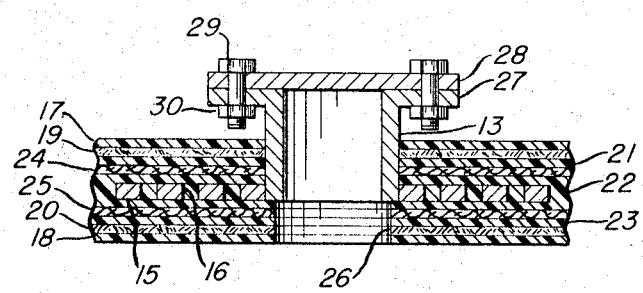
Figure 5:
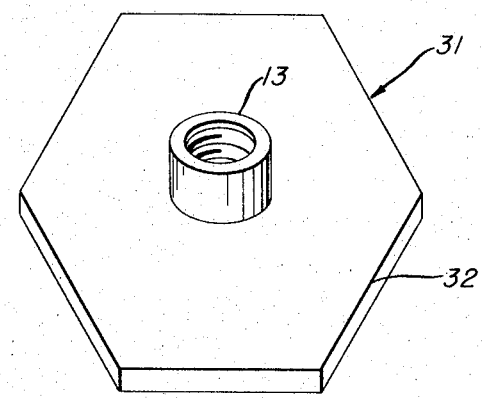
Figure 6:
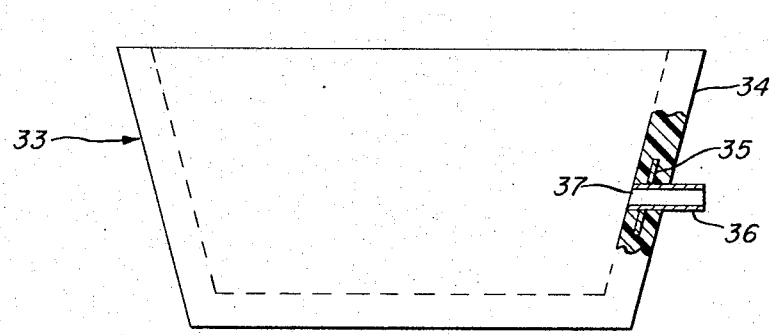

For a more complete understanding of the invention, reference is made to the accompanying drawings where like reference numerals refer to like parts throughout the views, in which: FIG. 1 is a side view of a hollow plastic tank provided with a plurality of metallic connecting means; FIG. 2 is a perspective view of an embodiment of connecting means of the invention; FIG. 3 is a fragmentary cross-sectional view on an enlarged scale taken at line 3—3 of FIG. 1 illustrating the laminated plastic shell and embedded metallic connecting means; FIG. 4 is an enlarged cross-sectional view of an alternative embodiment of the connecting means; FIG. 5 is a perspective view of another embodiment of the connecting means; and FIG. 6 is an end view of an open-top plastic vessel with a partially broken section showing the connecting means embedded in a wall.

Referring to FIG. 1, 10 designates a thin-wall plastic tank comprising a shell of a glass fiber reinforced plastic laminate having a tubular center portion 11 and outwardly curved ends 12. Tank 10 is provided with a plurality of tubular bodies 13 arranged in a predetermined pattern to provide openings communicating with the interior of the tank and adapted for coupling to conduits, not shown. The ends 12 alternatively can be either flat, dished or hemispherical in form and curved either inwardly or outwardly.

FIG. 2 illustrates connecting means 14 for connecting a plurality of tubular bodies 13 to the thin-wall plastic tank 10. Connecting means 14 comprises a perforated metal plate 15 provided with multiple small openings 16 and a plurality of tubular bodies 13 integrally mounted transversely to plate 15. The metallic tubular bodies 13 are internally threaded fittings for connecting to piping, not shown, and can be attached in any conventional manner such as by welding to the plate.

FIGS. 3 and 4 illustrate in cross-section an embedded connecting means in a fiber glass reinforced plastic laminate tank wall. The wall comprises a laminate of thermoset resin layers 17 and 18, glass fiber surfacing mats 19 and 20, and interposed between thermoset resin layers 21, 22 and 23 are a plurality of plies of reinforcing glass fibers 24 and 25. The glass fibers 19, 20, 24 and 25 are impregnated with and intimately bonded in thermoset resin layers 17, 18, 21, 22 and 23. Embedded between plies 24 and 25 and in resin layer 22 is plate 15 wherein the resin of layer 22 passes through and around small holes 16 securing plate 15 in resin layer 22 against both axial and rotational movement. Tubular body 13 extends through glass-resin layers 17, 19, 21, 22 and 24 in alignment with aperture 26 in glass-resin layers 18, 20, 22, 23 and 25 providing an opening in the laminate. In FIG. 3, tubular body 13 is an internally threaded fitting adapted for coupling to a conduit. In FIG. 4, tubular body 13 is provided with a second flange 27 which is adapted for coupling to a cover plate 28 in any conventional manner such as shown by bolt 29 and nut 30. Alternatively flange 27 can be connected to a flanged conduit, not shown. FIG. 5 illustrates a connecting means 31 comprising a tubular body 13 provided with a solid hexagonally shaped transverse flange 32 of substantially greater perimeter than circumference of body 13. It is to be understood that flange 32 can be of regular or irregular shape such as round, square, rectangular or hexagonal in form and either solid or perforated to secure tubular body in the plastic wall against both axial and rotational movement. Tubular body 13 can be internally or externally threaded or flanged for coupling to conduits or cover plates. Flange 32 is preferably of thin dimensions for embedding in wall of thin-wall plastic vessels. Further, flange 32 has cross-sectional dimensions sufficiently greater than those of tubular body 13 to secure means 31 in the plastic wall against both axial and rotational movement.

FIG. 6 illustrates an open-top thin-wall plastic vessel 33 having embedded in a wall 34 thereof flange portion 35 of flanged tubular body 36. Tubular body 36 provides an opening 37 in wall 34 communicating with the interior of vessel 33. Embedded flange portion 35 provides resistance to both axial and rotational movement of said body 36 in said wall 34.

Exemplary of horizontal plastic tanks made in accordance with this invention which are unitary structures substantially free from corrosive attack by environment and contents is a residential-type fuel oil storage tank about 6 feet in length and about 3 feet in diameter, having a capacity of about 275 gallons. The shell of such a tank comprises a glass fiber reinforced plastic laminate preferably composed of about 25–40% glass fiber reinforcing material embedded in about 60–75% thermoset resin. Conventional thermosetting resins known to the art can be used such as epoxy or unsaturated polyesters. The preferred thermosetting resin is a polymerizable mixture of about 55–65 parts of unsaturated isophthalic acid polyester resin and about 35–45 parts of styrene. The preferred polyester thermosetting resin is prepared conventionally from one mole of isophthalic acid, one mole of maleic anhydride and 2.2 moles of propylene glycol, and has an acid number of less than 15 and a hydroxyl number of less than 30. Catalytic curing of the thermosetting resin is used to form the thermoset plastic laminate in accordance with conventional curing techniques. The preferred catalyst system for the isophthalic polyester-styrene thermosetting resin is about 0.2% cobalt naphthenate and about 1.2% methylethyl ketone peroxide. As shown in FIGS. 3 and 4, the plastic laminate comprises a plurality of layers of glass fibers embedded in the thermoset resin matrix. It is to be understood that the choice of fabrication techniques, glass and thermosetting resin content of the laminate can be varied broadly and still give the proper chemical inertness and structural strength desired for such tanks.

It will be apparent to one skilled in the art that the present invention provides a simple and inexpensive means for connecting metallic elements to an all-plastic or fiber glass reinforced plastic vessel. Further, that plastic vessels so equipped are provided with protection against corrosion at the locus of attachment in the vessel wall and increased structural strength in the wall area adjacent openings therein. Further, that the connection means avoids complicated devices requiring gaskets, bolts, reinforcing rings, etc. and the possible damage to vessel walls when such devices are used during both installation of such devices on the tank and also during connection to external conduits or piping.

The shell, of the aforementioned 275-gallon storage tank, of glass fiber reinforced plastic laminate is formed on an appropriate mandrel by laying up alternate plies of polymerizable thermosetting resin and glass reinforcing material such as woven glass fabric, woven glass roving, woven glass spun roving or chopped glass impregnated with the resin. The thickness of the shell thus formed is about one-eighth inch thick. During the formation of the shell connecting means as shown in FIG. 2, comprising a 12-gauge perforated metal plate about 5 inches wide and 32 inches long having four 2-inch conventional tank fittings welded to its surface is appropriately mounted between the plies of the laminate, and is embedded in the liquid thermosetting resinous matrix. The resin surrounding the plate and passing through the perforations therein, after curing, thus securely locks the plate and attached fittings in the plastic laminate shell and provides resistance against both axial and rotational movement of the fittings. When piping is attached to such fittings, rotational forces in the order of 2000 pound-inches can be produced. It has been found that when conventional tank fittings are affixed to such plastic tanks in the manner described, sufficient structural strength is provided for resisting both axial and rotational movement of the fittings. Further, the upper chord of the tank is structurally reinforced against deformation by the use of a single plate provided with a plurality of fittings. In addition to the structural benefits obtained in accordance with the present invention in the vital area of the connecting means, the connecting means are protected against corrosive materials.

While the present invention has been described in connection with glass fiber reinforced tanks for underground storage of liquid hydrocarbons, it is to be understood that the invention is applicable for all types of plastic vessels where it is desired to provide one or more openings in the walls of such vessels and to join metallic elements thereto.

Thus, having described the invention, the invention claimed is:

1. A thin-wall plastic vessel having embedded in a wall thereof the flange portion of a metallic flanged tubular body providing an opening communicating with the interior of said vessel, said embedded flange provided with multiple small openings, and the plastic of said wall extending within and through said small openings to secure said tubular body against both axial and rotational movement in said wall.

2. A thin-wall plastic tank comprising the combination of a glass fiber-reinforced plastic laminate shell and a metallic flanged tubular body providing an opening communicating with the interior of said tank, said laminate consisting of a plurality of layers of glass fiber embedded in said plastic, said flanged tubular body having the flange portion thereof disposed between a pair of said layers of said fibers and embedded in said laminate, said embedded flange provided with multiple small openings, and the plastic of said laminate extending within and through said small openings securing said tubular body against both axial and rotational movement in said shell.

3. A horizontal tank comprising a shell having an elongated tubular center portion and end portions defining a substantially closed hollow structure, said shell comprising a glass fiber reinforced isophthalic polyester plastic laminate having a high resin content on the inner and outer surfaces, said laminate including a metallic flanged tubular body providing an opening communicating with the interior of said tank, said flanged tubular body having the flange portion thereof embedded in said laminate, said flange of greater perimeter than circumference of said tubular body and formed transversely thereof and further provided with multiple small openings, and the plastic of said laminate extends within said small openings to secure said tubular body against both axial and rotational movement in said laminate.

4. A thin-wall fiber glass reinforced plastic tank having an elongated tubular center portion and end portions defining a substantially closed hollow structure having a set of apertures formed therein and arranged in a predetermined pattern, connecting means comprising a metal plate including a plurality of metallic tubular bodies integrally mounted transversely to said plate and adapted for connecting to conduits, said means embedded in the wall of said tank relative to and having a plurality of tubular bodies corresponding in number and pattern to said first set of apertures, said plate having cross-sectional dimensions sufficiently greater than those of said tubular bodies to secure said means in said wall against both axial and rotational movement.

5. A horizontal substantially closed hollow glass fiber reinforced plastic tank suitable for underground storage of hydrocarbon liquids having a tubular center portion and end portions comprising a shell of a glass fiber reinforced thermoset resin laminate formed of thermosetting resinous material adapted to harden after being shaped to form said shell and a plurality of plies of reinforcing glass fibers embedded in and intimately bonded with said resinous material, said plies being substantially parallel to the surfaces of said shell; said tubular portion provided with means integrally disposed between adjacent plies of said fibers in said shell, said means comprising a metal plate including multiple small openings to provide passageways for said resinous material to secure said plate against both axial and rotational movement in said laminate and further including at least one transversely mounted tubular body to provide a passageway in said shell for communication with the interior of said tank, said plate having a substantially greater perimeter than the circumference of said tubular body.

References Cited by the Examiner

UNITED STATES PATENTS

| 2,268,961 | 1/1942 | Raymond | 220—30 X |
| 3,031,099 | 4/1962 | Wiltshire | 220—3 |
| 3,132,761 | 5/1964 | Sylvester | 220—3 |

FOREIGN PATENTS 565,976   8/1957   Italy.

THERON E. CONDON, *Primary Examiner.*

GEORGE E. LOWRANCE, *Examiner.*